United States Patent [19]

Prucher

[11] Patent Number: 4,728,765
[45] Date of Patent: Mar. 1, 1988

[54] SPOT WELDING ELECTRODE

[75] Inventor: Bryan P. Prucher, Clarkston, Mich.

[73] Assignee: Hobie Holding, Inc., Clarkston, Mich.

[21] Appl. No.: 905,860

[22] Filed: Sep. 10, 1986

[51] Int. Cl.⁴ .................... B23K 11/30; B23K 35/02
[52] U.S. Cl. ...................................... 219/120; 219/119
[58] Field of Search ................... 219/119, 120, 86.1

[56] References Cited

U.S. PATENT DOCUMENTS

| | | | |
|---|---|---|---|
| 2,471,340 | 5/1949 | Morrissey | 219/120 |
| 2,513,323 | 7/1950 | Hensel et al. | 219/120 |
| 3,511,963 | 5/1970 | Chmiel | 219/120 |
| 3,592,994 | 7/1971 | Ford | 219/119 |
| 2,829,239 | 4/1958 | Boretti | 219/120 |
| 3,944,778 | 3/1976 | Bukhovsky et al. | 219/121 P |
| 4,476,372 | 10/1984 | Prucher | 219/120 |
| 4,588,870 | 5/1986 | Nadkarni et al. | 219/119 |

FOREIGN PATENT DOCUMENTS

| | | | |
|---|---|---|---|
| 1594464 | 7/1970 | France | 219/120 |
| 155239 | 5/1982 | German Democratic Rep. | 219/120 |
| 708624 | 5/1954 | United Kingdom | 219/119 |

Primary Examiner—E. A. Goldberg
Assistant Examiner—C. M. Sigda
Attorney, Agent, or Firm—Arnold S. Weintraub

[57] ABSTRACT

A spot welding electrode and method of assembling the same. The electrode includes a cap having a hollow cavity with an open bottom end and a closed tip. A plurality of circumferentially spaced fins are formed interiorally in the cap and extend inward from the side wall of the cap. The upper ends of the fin meet and have a spherical domed shape. The bottom ends of the fins are spaced from the bottom end of the cap to form a coolant flow path within the electrode. A shoulder is formed on the bottom wall of the electrode and mates with and is joined to a complimentary formed shoulder on the upper end of a shank to mount the cap to the shank.

4 Claims, 2 Drawing Figures

SPOT WELDING ELECTRODE

BACKGROUND OF THE INVENTION

1. Field of the Invention

This invention relates, in general, resistance spot welding equipment and, more specifically, to resistance spot welding electrodes.

2. Description of the Prior Art

Resistance spot welding is a process used to join to thin metal sheets together. A spot weld is produced by clamping two thin sheets of metal together under high pressure or force between two axially aligned electrodes and passing an electrical current between the electrodes through the sheets. The high resistance at the interface of the two metal sheets causes heating of the sheets in an area between the contact surfaces or tips of the electrodes. This rapid heating forms a molten zone of metal which, when cooled, forms a solid weld spot or nugget fusing the two metal sheets together at that point.

The electrodes used for form a spot weld are typically constructed of a highly electrically conductive material, such as copper. The size and shape of the electrodes determines the size and shape of the spot weld. The electrodes may have an integral single piece form or, more conventionally, may be constructed of a holder or shank portion which receives a replaceable cap at its upper end. The interior of the electrode and cap is hollow and is provided with coolant flow paths for removing heat generated by the high electrical current passing through the electrode.

During repeated spot welding operations, the electrodes experience considerable deformation at their contact surfaces due to the high clamping pressures and the heat generated by the electrical current passing through each electrode. Such deformation causes the contact surface of the electrodes to spread out or "mushroom" which increases its diameter and decreases the strength of the weld spot. Frequent reshaping or "dressing" of the electrode tip is required to retain the electrode tip in its original size and shape to create the required weld spot. This interrupts the welding operation which lowers overall production and increases labor costs since manual hand operations are typically employed to reshape the electrode tip to its desired shape and diameter.

Thus, it would be desirable to provide a spot welding electrode which overcomes the problems of previously constructed spot welding electrodes. It would also be desirable to provide a spot welding electrode which has increased heat transfer flow to enhance its useful life.

SUMMARY OF THE INVENTION

The present invention is a spot welding electrode which includes a cap and a shank or holder. The cap includes a hollow cavity having an open bottom end and a closed tip end with the outer surface being formed of any conventional shape, such as tapered, conical, angled or with a self-dressing tip as disclosed in U.S. Pat. No. 4,476,372.

A plurality of circumferentially spaced fins or ribs are formed interiorally in the cap and extend inward from the wall of the cap. The fins or ribs are formed with first and second ends, the first end being located in proximity with the tip of the cap or housing and is disposed in substantial registry with the first ends of the other fins or ribs. The second ends are located adjacent the second or bottom end of the cap and have a curved, depending shape so as to be spaced away from the second end of the cap to provide coolant fluid flow paths between the cap and the attached shank or holder. This prevents a steam build-up zone between the cap and the attached shank or holder which could lead to cavitation and degradation of the integrity electrode.

The spot welding electrode also includes a unique attachment arrangement between the electrode and the shank in which a shoulder is formed on the bottom end of the electrode tip which is matingly joined with a complimentary formed shoulder on the shank by means of spin welding, laser beam welding, etc. This enables both the shank and the electrode to be manufactured by a cold forming process which reduces manufacturing costs in constructing the spot welding electrode.

BRIEF DESCRIPTION OF THE DRAWING

The various advantages, features and uses of the present invention will become more apparent by referring to the following description and drawing in which.

DESCRIPTION OF THE PREFERRED EMBODIMENTS

Figure 1:
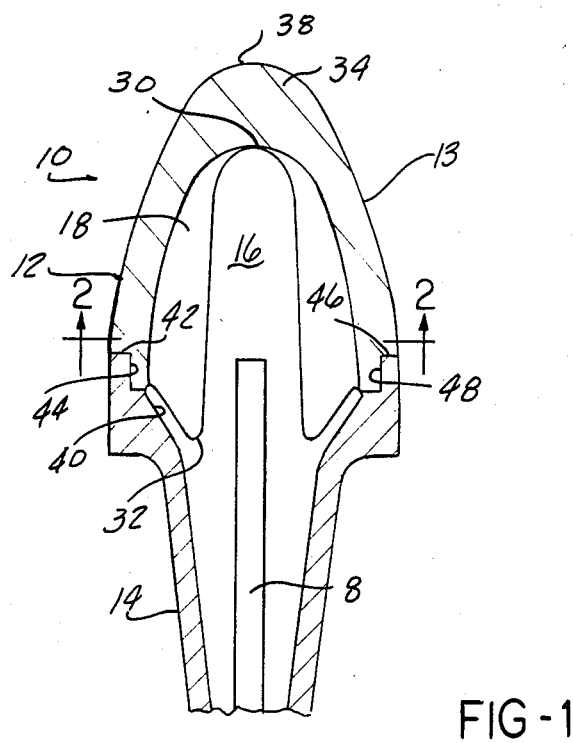
FIG. 1 is a cross-sectional view through the center of the spot welding electrode of the present invention.

Throughout the following description and drawing, an identical reference number is used to refer to the same component shown in both figures of the drawing.

It will be understood that the term "electrode" as used in the present invention describes that portion of a spot welding apparatus which contacts two metal sheets under high pressure and directs electrical current through the two sheets in an area corresponding to the surface area of the contact surface of two opposed electrodes. Each electrode may be formed of an integral single piece assembly having an elongated shank with the end or tip of the shank forming the contact surface of the electrode or of an elongated shank having a replaceable tip which is mounted on the end of the shank.

Figure 2:
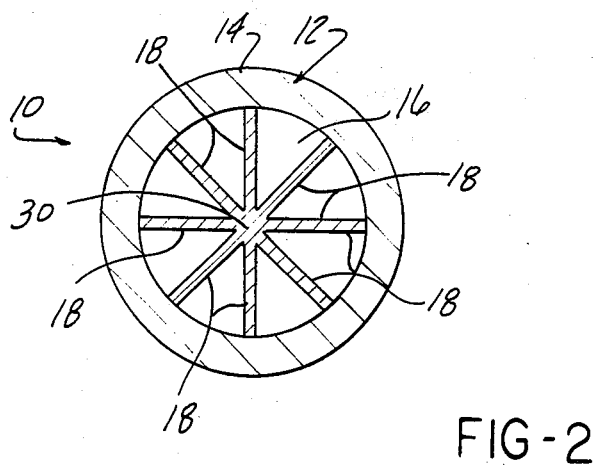
FIG. 2 is a cross-sectional view, generally taken along line 2—2 in FIG. 1 of the spot welding electrode of the present invention.

Referring now to FIGS. 1 and 2, there is illustrated a spot welding electrode 10 including a tip 12 and an elongated shank or adapter 14. The electrode 10 may have any outer configuration, such as the tapered shape shown in FIG. 1, a circular shape or either shapes with the self-dressing tip portion depicted in U.S. Pat. No. 4,476,372.

The electrode 10 is formed with a housing or cap 13 having a hollow interior or cavity 16. A plurality of heat transfer fins or ribs 18 are mounted within the cavity 16 in a circumferential-spaced manner about the circumference of the cavity 16. The fins 18 provide coolant flow paths from the coolant flow tube 8 through the interior surfaces of the electrode tip 12 and the shank 14.

The fins 18 have an elongated shape and a thin cross-section as shown in FIG. 2. Each of the fins 18 has a top end 30 and a second or bottom end 32. The tops ends 30 of each of the fins 18 meet in substantial registry at center of 34 of the tip 12 of the housing 13. This forms a solid domed or spherical structure which supports the housing 13 as the tip end 38 of the housing 13 wears away during repeated spot welding operations. This prevents the opening of the center of the tip 38 as frequently occurs with previously devised spot welding electrodes.

The bottom end 32 of the fins 18 is spaced a short distance away from and downward from the interior surface of the surrounding electrode housing 13 and the shank 14 as shown in FIG. 1 to define a space 40 between the inner edge of the bottom end 32 of the fin 18 and the surrounding housing 13 or shank 14. This provides a coolant flow path which eliminates the formation of a steam pocket or cavity as in previous designs having a flat shoulder between the electrode housing 13 and the shank 14.

The housing 13 has a flat shoulder 42 located at the second end with a depending flange portion 44. A complimentary shaped shoulder 46 and flange 48 are formed on the upper end of the shank 14 to mate with the shoulder and flange 42 and 44, respectively.

The tip 12 is joined to the shank 14 by any method, such as by spin welding, laser beam welding, etc. This configuration enables both the tip 12 and the shank 14 to be formed by a cold forming process which minimizes manufacturing costs and simplifies the construction of the welding electrode 10.

The two part configuration of the tip 12 and the shank or adapter 14 enables increased coolant flow to the electrode 10 due to the increased volume of the internal cavity. Also, the tip 12 and the adapter 14 may be constructed of dissimilar materials enabling the electrode 10 to be configured to the particular metallurgical characteristic of a particular application.

In summary, there has been disclosed a unique spot welding electrode which presents reduced manufacturing costs as well as increased life due to enhanced cooling. A plurality of circumferentially spaced fins are formed integrally within the cavity in the electrode cap and meet at an upper end at the tip end of the electrode cap to provide increased strength for the electrode to resist deformation and breakthrough during multiple spot welding operations.

What is claimed is:

1. A spot welding electrode cap comprising:
   a housing having an open bottom, and a tip end and an internal cavity;
   a plurality of circumferentially spaced fins on the housing within the cavity;
   the fins having first and second ends, the second end of each of the fins meeting in substantial registry to each other at the center of the tip end of the housing.

2. The spot welding electrode cap of claim 1 wherein the fins gradually decrease in radial width in a direction approaching the second ends.

3. The spot welding electrode cap of claim 1 wherein the first end of the fin is spaced from the housing to form a fluid flow path therebetween.

4. The spot welding electrode cap of claim 1 wherein the registry of the second ends of the fins forms a solid domed structure which supports the housing as the tip end thereof wears away.

* * * * *